(12) United States Patent
Lee et al.

(10) Patent No.: US 12,487,711 B2
(45) Date of Patent: Dec. 2, 2025

(54) TOUCH DISPLAY DEVICE

(71) Applicant: LG Display Co., Ltd., Seoul (KR)

(72) Inventors: Jae Ho Lee, Paju-si (KR); Jisu Yoon, Paju-si (KR); DongRyul Jung, Paju-si (KR); Kyuhwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/773,337

(22) Filed: Jul. 15, 2024

(65) Prior Publication Data
US 2025/0044900 A1 Feb. 6, 2025

(30) Foreign Application Priority Data

Aug. 1, 2023 (KR) .................. 10-2023-0100470

(51) Int. Cl.
*G06F 3/042* (2006.01)
*G06F 3/0354* (2013.01)
*G06F 3/041* (2006.01)

(52) U.S. Cl.
CPC ........ *G06F 3/0421* (2013.01); *G06F 3/03542* (2013.01); *G06F 3/03545* (2013.01); *G06F 3/041* (2013.01); *G06F 3/0412* (2013.01)

(58) Field of Classification Search
CPC .............. G06F 3/0421; G06F 3/03545; G06F 3/03542; G06F 3/0412; G06F 3/041; B32B 7/023; B32B 7/12; G02B 5/02; G02B 5/20
See application file for complete search history.

(56) References Cited

U.S. PATENT DOCUMENTS

| | | | |
|---|---|---|---|
| 4,806,221 A * | 2/1989 | Gillery ................. | C23C 14/086 204/192.27 |
| 2009/0268132 A1* | 10/2009 | Takama ............... | G06F 3/0421 349/116 |
| 2013/0321357 A1* | 12/2013 | Yamada ............... | G06F 3/0386 345/179 |
| 2014/0267191 A1* | 9/2014 | Takahara ........... | G06F 3/03545 345/179 |
| 2015/0130726 A1* | 5/2015 | Min ..................... | G06F 3/0443 345/173 |
| 2021/0249619 A1* | 8/2021 | Seo ........................ | H10K 50/11 |
| 2023/0229274 A1* | 7/2023 | Yoo ..................... | G02F 1/13338 345/173 |

* cited by examiner

*Primary Examiner* — Patrick N Edouard
*Assistant Examiner* — Joseph P Fox
(74) *Attorney, Agent, or Firm* — Fenwick & West LLP

(57) ABSTRACT

A touch display device comprising a display panel including a plurality of light emitting elements and a plurality of transistors and an infrared absorption pattern formed on an emission surface of the display panel, wherein electrodes included in the plurality of light emitting elements or electrodes included in the plurality of transistors are infrared reflective electrodes.

16 Claims, 15 Drawing Sheets

TOUCH DISPLAY DEVICE

CROSS-REFERENCE TO RELATED APPLICATION

This application claims priority from Republic of Korea Patent Application No. 10-2023-0100470, filed on Aug. 1, 2023, which is hereby incorporated by reference in its entirety.

BACKGROUND

Field

Embodiments of the disclosure relate to a touch display device and, more specifically, to a touch display device capable of detecting a touch from an infrared stylus etc., using an infrared absorption pattern and an infrared reflective structure.

Description of Related Art

The growth of the intelligent society leads to increased demand for various types of display devices. Various display devices, such as liquid crystal displays, electroluminescent displays, or quantum dot light emitting displays, are being used.

The display device recognizes the user's finger touch or a pen touch on the display panel and performs input processing based on the recognized touch so as to provide more various functions.

As an example, a display device capable of touch recognition may include a plurality of touch electrodes arranged or embedded in a display panel and detect the presence of the user's touch on the display panel and coordinates of a touch by driving the touch electrodes.

Such touch display devices are in a trend of being adopted in more sectors, such as for large-scale touch display devices, such as vehicle displays and showcase displays, as well as mobile devices, such as smartphone or tablet PCs.

In this case, the touch function for the touch display device may use not only a passive stylus, such as a finger, but also an active stylus capable of transmitting and receiving signals to and from the display panel.

SUMMARY

The inventors of the disclosure have invented a touch display device capable of detecting an infrared reflective pattern using an infrared absorption pattern and an infrared reflective structure.

Embodiments of the disclosure may form a touch display device into a lightweight thin structure by using a metal electrode in the display panel as an infrared reflective structure.

Embodiments of the disclosure may provide a touch display device capable of effectively detecting an infrared reflective pattern by combining a functional film with an infrared absorption pattern considering infrared transmittance.

In one embodiment, a touch display device comprises: a display panel including a plurality of light emitting elements that are configured to emit light and a plurality of transistors that are electrically connected to the plurality of light emitting elements; and an infrared absorption pattern configured to absorb infrared light that is incident on the infrared absorption pattern, the infrared absorption pattern on an emission surface of the display panel through which the light emitted by the plurality of light emitting elements is emitted outside of the display panel, wherein the plurality of light emitting elements include infrared reflective electrodes that reflect infrared light incident onto the infrared reflective electrodes or the plurality of transistors include infrared reflective electrodes that reflect infrared light incident onto the infrared reflective electrodes.

In one embodiment, a touch sensing system comprises: a pen configured to output infrared light; a display panel including a plurality of light emitting elements that are configured to emit visible light, the plurality of light emitting elements including infrared reflective electrodes that reflect a portion of the infrared light outputted by the pen that is incident onto the infrared reflective electrodes; and an infrared absorption pattern on the display panel, the infrared absorption pattern configured to absorb a portion of the infrared light outputted by the pen that is incident on the infrared absorption pattern, wherein the pen is configured to sense its location on the display panel according to a pattern of infrared light reflected back to the pen, the pattern of infrared light including the infrared light reflected from the infrared reflective electrodes of the plurality of light emitting elements.

According to embodiments of the disclosure, it is possible to detect an infrared reflective pattern using an infrared absorption pattern and an infrared reflective structure.

According to embodiments of the disclosure, it is also possible to form a touch display device into a lightweight thin structure by using a metal electrode in the display panel as an infrared reflective structure.

According to embodiments of the disclosure, it is also possible to effectively detect an infrared reflective pattern by combining a functional film with an infrared absorption pattern considering infrared transmittance.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
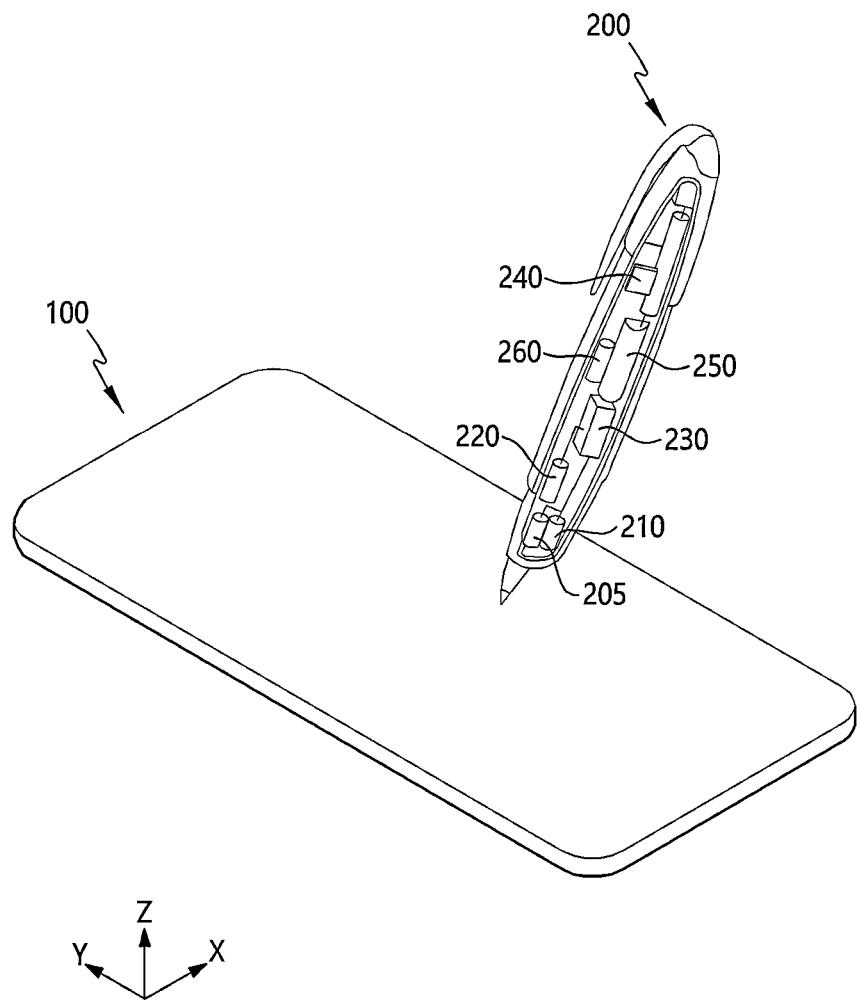
FIG. 1 is a perspective view illustrating a touch sensing system according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

Figure 2:
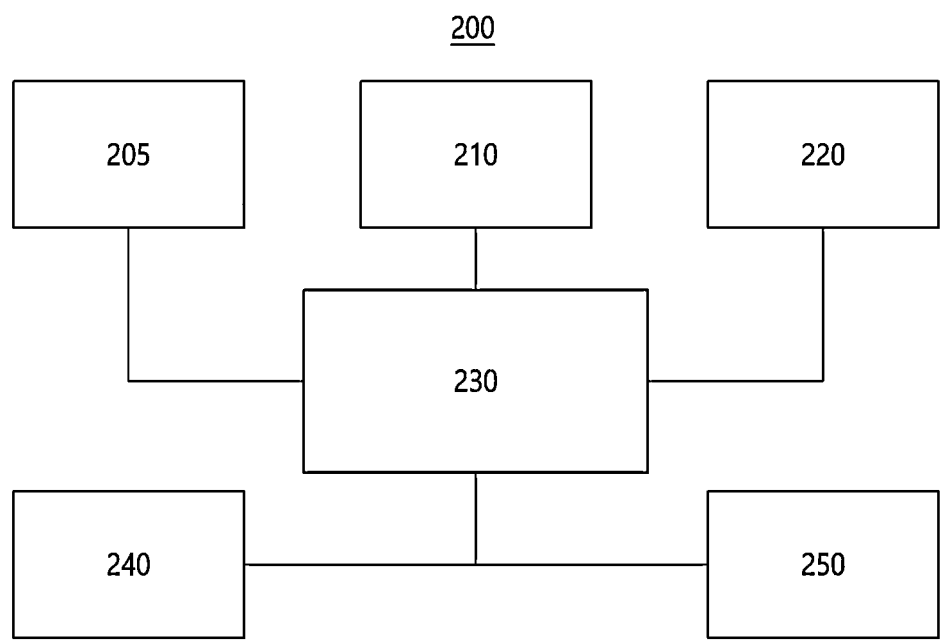
FIG. 2 is a block diagram conceptually illustrating an infrared stylus in a touch sensing system according to embodiments of the disclosure.
Figure 3:
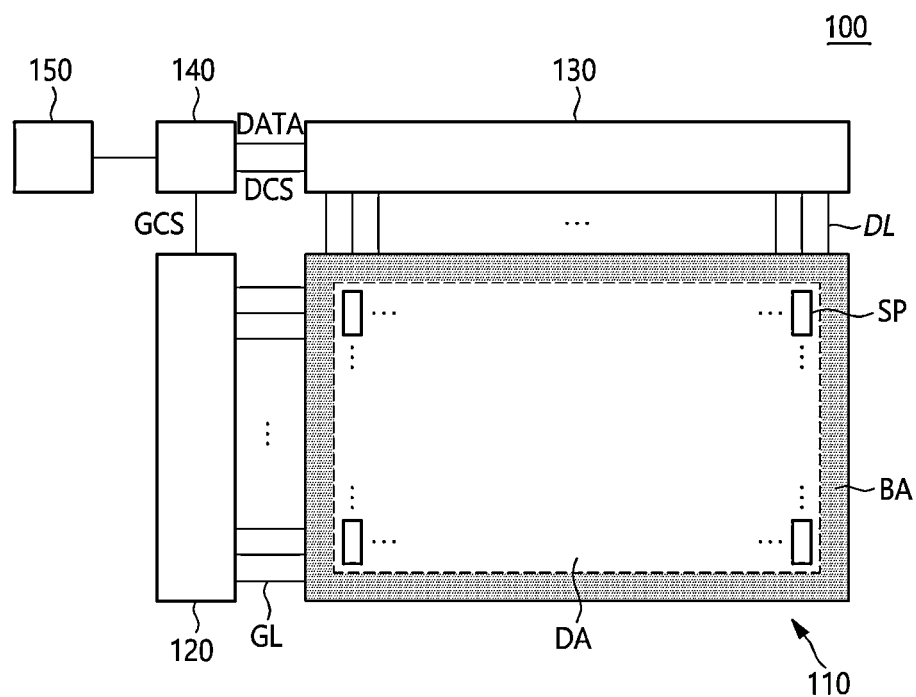
FIG. 3 is a block diagram schematically illustrating a touch display device in a touch sensing system according to embodiments of the disclosure.

FIG. 1 is a perspective view illustrating a touch sensing system according to embodiments of the disclosure. FIG. 2 is a block diagram conceptually illustrating an infrared stylus in a touch sensing system according to embodiments of the disclosure. FIG. 3 is a block diagram schematically illustrating a touch display device in a touch sensing system according to embodiments of the disclosure.

Referring to FIGS. 1 to 3, a touch sensing system according to embodiments of the disclosure may include a touch display device 100 and an infrared stylus 200.

The infrared stylus 200 may include an infrared light emitting element 205, an infrared sensor 210, a piezoelectric sensor 220, a processor 230, a communication module 240, a memory 250, and a battery 260.

The infrared stylus 200 may be a smart pen or active pen capable of generating coordinate data using an optical method.

The infrared light emitting element 205 is disposed in a front portion of the infrared stylus 200 and may emit infrared light in the direction of the touch display device 100. The infrared light emitting element 205 may be formed of an infrared light emitting diode.

The infrared sensor 210 may be disposed in the front portion of the infrared stylus 200. For example, the infrared sensor 210 is disposed adjacent to the infrared light emitting element 205 as shown in FIG. 1. The infrared sensor 210 may detect reflected infrared light transferred from the touch display device 100 through an infrared absorption pattern and an infrared reflective structure formed in the touch display device 100.

The infrared sensor 210 may continuously photograph reflected infrared light at a corresponding position according to the movement of the infrared stylus 200, and provide infrared pattern information detected through the reflected infrared light to the processor 230.

The piezoelectric sensor 220 may sense the pressure applied by the infrared stylus 200 to the touch display device 100. The piezoelectric sensor 220 may provide pressure information about the infrared stylus 200 to the processor 230.

The processor 230 (e.g., a circuit) may receive at least one piece of infrared pattern information from the infrared sensor 210. The processor 230 may convert the infrared pattern information into a data code and generate coordinate data using the data code.

In this case, the processor 230 may quickly generate coordinate data without complex computations or corrections by converting the infrared pattern information into a one-to-one corresponding data code. Therefore, the touch sensing system of the disclosure may reduce power consumption and simplify driving operations.

The processor 230 may transmit the generated coordinate data to the touch display device 100 through the communication module 240.

The communication module 240 (e.g., a circuit) may perform wired or wireless communication with an external device. For example, the communication module 240 may transmit and receive wired or wireless signals with the communication circuit of the touch display device 100.

The memory 250 may store data necessary for the driving operation of the infrared stylus 200. Since the infrared stylus 200 may convert the infrared pattern information into corresponding data code and may directly provide the coordinate data generated therefrom to the touch display device 100, the infrared stylus 200 may include the memory 250 having a capacity corresponding to one piece of infrared pattern information. In one embodiment, the memory 250 stores information that maps each infrared pattern from a plurality of different infrared patterns into a corresponding data code that indicates coordinate data (e.g., a particular location) on the touch display device 100.

The touch display device 100 according to embodiments of the disclosure may include a display panel 110 and a driving circuit for driving the display panel 110.

The display panel 110 may include a display area DA in which images are displayed and a bezel area BA in which no image is displayed. The bezel area BA may also be referred to as a non-display area.

The display panel 110 may include a plurality of subpixels SP for displaying images. For example, a plurality of subpixels SP may be disposed in the display area DA. In some cases, at least one subpixel SP may be disposed in the bezel area BA. At least one subpixel SP disposed in the bezel area BA is also referred to as a dummy subpixel.

The display panel 110 may include a plurality of signal lines for driving a plurality of subpixels SP. For example, the plurality of signal lines may include a plurality of data lines DL and a plurality of gate lines GL. The signal lines may further include other signal lines than the plurality of data lines DL and the plurality of gate lines GL according to the structure of the subpixel SP. For example, the other signal lines may include driving voltage lines and reference voltage lines.

The plurality of data lines DL and the plurality of gate lines GL may cross each other. Each of the plurality of data lines DL may be disposed while extending in a first direction. Each of the plurality of gate lines GL may be disposed while extending in a second direction. Here, the first direction may be a column direction and the second direction may be a row direction. In the disclosure, the column direction and the row direction are relative. For example, the column direction may be a vertical direction and the row direction may be a horizontal direction. As another example, the column direction may be a horizontal direction and the row direction may be a vertical direction.

The driving circuit may include a data driving circuit 130 for driving a plurality of data lines DL and a gate driving circuit 120 for driving a plurality of gate lines GL. The driving circuit may further include a timing controller 140 for controlling the data driving circuit 130 and the gate driving circuit 120.

The data driving circuit 130 is a circuit for driving the plurality of data lines DL, and may output data signals (also referred to as data voltages) corresponding to image signals to the plurality of data lines DL. The gate driving circuit 120 is a circuit for driving the plurality of gate lines GL and may generate gate signals, and output the gate signals to the plurality of gate lines GL. The gate signal may include one or more scan signals and emission signals.

The timing controller 140 may start a scan according to the timing implemented in each frame and may control data driving at an appropriate time according to the scan. The timing controller 140 may convert input image data input from the outside to suit the data signal format used by the data driving circuit 130 and supply the converted image data DATA to the data driving circuit 130.

The timing controller 140 may receive display driving control signals, along with input image data, from an external host system. For example, the display driving control signals may include a vertical synchronizing signal, a horizontal synchronizing signal, an input data enable signal, and a clock signal.

The timing controller 140 may generate the data driving control signal DCS and the gate driving control signal GCS based on display driving control signals input from the host system. The timing controller 140 may control the driving operation and driving timing of the data driving circuit 130 by supplying the data driving control signal DCS to the data driving circuit 130. The timing controller 140 may control the driving operation and driving timing of the gate driving circuit 120 by supplying the gate driving control signal GCS to the gate driving circuit 120.

The data driving circuit 130 may include one or more source driving integrated circuits SDIC. Each source driving integrated circuit may include a shift register, a latch circuit, a digital to analog converter (DAC), an output buffer, and the like. In some cases, each source driving integrated circuit may further include an analog to digital converter (ADC).

For example, each source driving integrated circuit may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 120 may output a gate signal of a turn-on level voltage or a gate signal of a turn-off level voltage according to the control of the timing controller 140. The gate driving circuit 120 may sequentially drive the plurality of gate lines GL by sequentially supplying gate signals of the turn-on level voltage to the plurality of gate lines GL.

The gate driving circuit 120 may include one or more gate driving integrated circuits GDIC.

The gate driving circuit 120 may be connected with the display panel 110 by TAB method or connected to a bonding pad of the display panel 110 by a COG or COP method or may be connected with the display panel 110 according to a COF method. Alternatively, the gate driving circuit 120 may be formed, in a gate in panel (GIP) type, in the bezel area BA of the display panel 110. The gate driving circuit 120 may be disposed on the substrate or may be connected to the substrate. In other words, the gate driving circuit 120 that is of a GIP type may be disposed in the bezel area BA of the substrate. The gate driving circuit 120 that is of a chip-on-glass (COG) type or chip-on-film (COF) type may be connected to the substrate.

Meanwhile, at least one of the data driving circuit 130 and the gate driving circuit 120 may be disposed in the display area DA. For example, at least one of the data driving circuit 130 and the gate driving circuit 120 may be disposed not to overlap the subpixels SP or to overlap all or some of the subpixels SP.

The data driving circuit 130 may be connected to one side (e.g., an upper or lower side) of the display panel 110. Depending on the driving scheme or the panel design scheme, the data driving circuit 130 may be connected with both sides (e.g., upper and lower sides) of the self-emission display panel 110, or two or more of the four sides of the self-emission display panel 110.

The gate driving circuit 120 may be connected with one side (e.g., a left or right side) of the display panel 110. Depending on the driving scheme or the panel design scheme, the gate driving circuit 120 may be connected with both sides (e.g., left and right sides) of the display panel 110, or two or more of the four sides of the display panel 110.

The timing controller 140 may be implemented as a separate component from the data driving circuit 130, or the timing controller 140 and the data driving circuit 130 may be integrated into an integrated circuit (IC). The timing controller 140 may be a controller used in typical display technology or a control device that may perform other control functions as well as the functions of the timing controller, or a circuit in the control device. The timing controller 140 may be implemented as various circuits or electronic components, such as an integrated circuit (IC), a field programmable gate array (FPGA), an application specific integrated circuit (ASIC), or a processor.

The timing controller 140 may be mounted on a printed circuit board or a flexible printed circuit and may be electrically connected with the data driving circuit 130 and the gate driving circuit 120 through the printed circuit board or the flexible printed circuit. The timing controller 140 may transmit/receive signals to/from the data driving circuit 130 according to one or more predetermined interfaces. The interface may include, e.g., a low voltage differential signaling (LVDS) interface, an EPI interface, and a serial peripheral interface (SP).

The touch display device 100 according to embodiments of the disclosure may be a self-emissive display device in which the display panel 110 emits light by itself. When the touch display device 100 according to the embodiments of the disclosure is a self-emissive display device, each of the plurality of subpixels SP may include a light emitting element. For example, the touch display device 100 according to embodiments of the disclosure may be an organic light emitting diode display in which the light emitting element is implemented as an organic light emitting diode (OLED). As another example, the touch display device 100 according to embodiments of the disclosure may be an inorganic light emitting display device in which the light emitting element is implemented as an inorganic material-based light emitting diode. As another example, the touch display device 100 according to embodiments of the disclosure may be a quantum dot display device in which the light emitting element is implemented as a quantum dot which is self-emission semiconductor crystal.

The timing controller 140 may perform wired/wireless communication with an infrared stylus through the communication circuit 150.

The communication circuit 150 may receive coordinate data from the infrared stylus 200 and provide the coordinate data to the timing controller 140.

The timing controller 140 may generate image data DATA by combining input image data supplied from the host system and the coordinate data supplied from the infrared stylus 200.

The data driving circuit 130 may display the image data DATA including the coordinate data of the infrared stylus 200 through the display panel 110.

Figure 4:
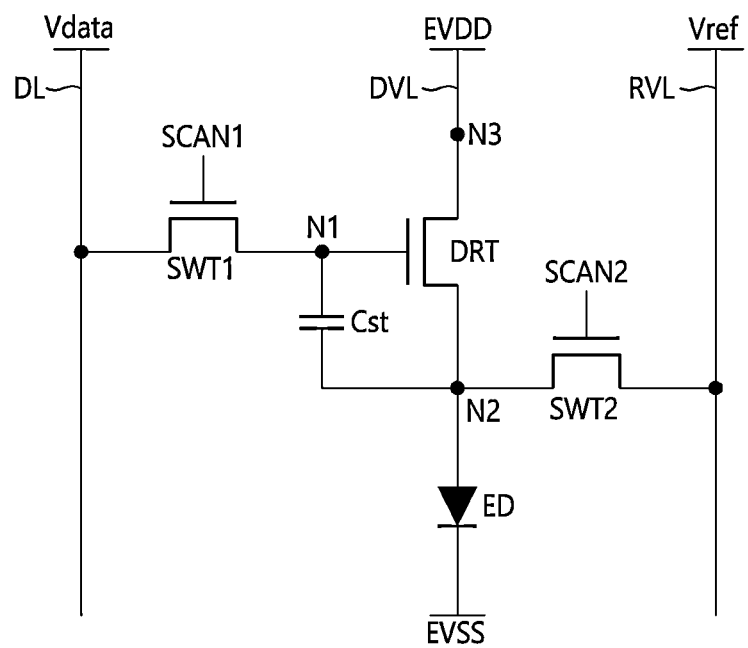
FIG. 4 is a view illustrating an example of a circuit constituting a subpixel in a touch display device according to embodiments of the disclosure.

FIG. 4 is a view illustrating an example of a circuit constituting a subpixel in a touch display device according to embodiments of the disclosure.

Referring to FIG. 4, in the touch display device 100 according to embodiments of the disclosure, the subpixel SP may include one or more transistors and a capacitor and may have a light emitting element disposed therein.

For example, the subpixel SP may include a driving transistor DRT, a first switching transistor SWT1, a second switching transistor SWT2, a storage capacitor Cst, and a light emitting diode ED.

The driving transistor DRT includes the first node N1, second node N2, and third node N3. The first node N1 of the driving transistor DRT may be a gate node to which the data voltage Vdata is applied from the data driving circuit 130 through the data line DL when the first switching transistor SWT1 is turned on.

The second node N2 of the driving transistor DRT may be electrically connected with the anode electrode of the light emitting diode ED and may be the source node or drain node.

The third node N3 of the driving transistor DRT may be electrically connected with the driving voltage line DVL to which the subpixel driving voltage EVDD is applied and may be the drain node or the source node.

In this case, during a display driving period, a subpixel driving voltage EVDD necessary for displaying an image may be supplied to the driving voltage line DVL. For example, the subpixel driving voltage EVDD necessary for displaying an image may be 27V.

The first switching transistor SWT1 is electrically connected between the first node N1 of the driving transistor DRT and the data line DL, and the gate line GL is connected to the gate node. Thus, the switching transistor SWT is operated according to the first scan signal SCAN1 supplied through the gate line GL. When turned on, the first switching transistor SWT1 transfers the data voltage Vdata supplied through the data line DL to the gate node of the driving transistor DRT, thereby controlling the operation of the driving transistor DRT.

The second switching transistor SWT2 is electrically connected between the second node N2 of the driving transistor DRT and the reference voltage line RVL, and the gate line GL is connected to the gate node and is operated according to the second scan signal SCAN2 supplied through the gate line GL. When the second switching transistor SWT2 is turned on, a reference voltage Vref supplied through the reference voltage line RVL is transferred to the second node N2 of the driving transistor DRT.

In other words, as the first switching transistor SWT1 and the second switching transistor SWT2 are controlled, the voltage of the first node N1 and the voltage of the second node N2 of the driving transistor DRT are controlled, so that the current for driving the light emitting diode ED may be supplied.

The gate nodes of the first switching transistor SWT1 and the second switching transistor SWT2 may be commonly connected to one gate line GL or may be connected to different gate lines GL. An example is shown in which the first switching transistor SWT1 and the second switching transistor SWT2 are connected to different gate lines GL in which case the first switching transistor SWT1 and the second switching transistor SWT2 may be independently controlled by the first scan signal SCAN1 and the second scan signal SCAN2 transferred through different gate lines GL.

In contrast, if the first switching transistor SWT1 and the second switching transistor SWT2 are connected to one gate line GL, the first switching transistor SWT1 and the second switching transistor SWT2 may be simultaneously controlled by the first scan signal SCAN1 or second scan signal SCAN2 transferred through one gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting diode ED may be electrically connected with the second node N2 of the driving transistor DRT, and a base voltage EVSS may be applied to the cathode electrode of the light emitting diode ED.

The base voltage EVSS may be a ground voltage or a voltage higher or lower than the ground voltage. The base voltage EVSS may be varied depending on the driving state. For example, the base voltage EVSS at the time of display driving and the base voltage EVSS at the time of sensing driving may be set to differ from each other.

The first switching transistor SWT1 and the second switching transistor SWT2 may be referred to as scan transistors controlled through scan signals SCAN1 and SCAN2.

The structure of the subpixel SP may further include one or more transistors or, in some cases, further include one or more capacitors.

Figure 5:
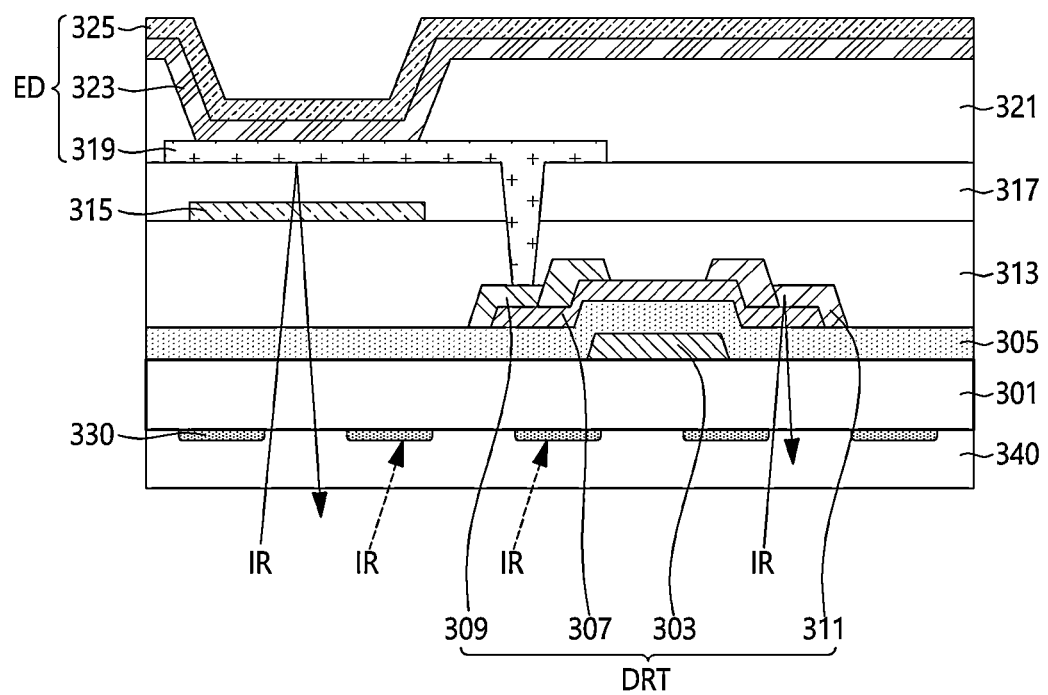
FIG. 5 is a cross-sectional view schematically illustrating a touch display device according to embodiments of the disclosure.

FIG. 5 is a cross-sectional view schematically illustrating a touch display device according to embodiments of the disclosure.

Referring to FIG. 5, a touch display device 100 according to embodiments of the disclosure may include a substrate 301, a driving transistor DRT, a color filter 315, a light emitting element ED, an infrared absorption pattern 330, and an infrared reflective structure.

Here, the driving transistor DRT is illustrated as an example, but the switching transistors SWT1 and SWT2 may have a structure similar to that of the driving transistor DRT depending on the position.

The substrate 301 may have a flexible characteristic. Here, the flexible characteristic may be interpreted as the same meaning as a bendable, unbreakable, rollable, foldable characteristic, or the like.

The substrate 301 may be formed of a transparent glass material or plastic.

When the substrate 301 is formed of plastic, it may be referred to as a plastic film or a plastic substrate. For example, the substrate 301 may include one selected from the group consisting of a polyester-based polymer, a silicon-based polymer, an acrylic polymer, a polyolefin-based polymer, and a copolymer thereof. Specifically, the substrate 301 may be formed of polyimide (PI). Polyimide (PI) is widely used for a plastic substrate because it may be applied to a high-temperature process and may be coated.

When the substrate 301 is formed of polyimide (PI), a manufacturing process of the touch display device 100 may be performed in a situation in which a supporting substrate formed of glass is disposed under the substrate 301, and the supporting substrate may be removed after the manufacturing process of the touch display device 100 is completed. Further, after the supporting substrate is removed, a back plate for supporting the substrate 301 may be disposed under the substrate 301.

The driving transistor DRT includes a gate electrode 303, an active layer 307, a drain electrode 309, and a source electrode 311, and is a transistor for driving the light emitting element ED. The driving transistor DRT may be a bottom gate structure in which the gate electrode 303, the gate insulation layer 305, the active layer 307, the drain electrode 309, and the source electrode 311 are sequentially stacked. In the bottom gate structure, the gate electrode 303 is under the active layer 307 such that the gate electrode 303 is between the substrate 301 and the active layer 307.

The gate electrode 303 may be formed of a metallic material, e.g., any one of molybdenum (Mo), aluminum (Al), chromium (Cr), gold (Au), titanium (Ti), nickel (Ni), neodymium (Nd), and copper (Cu), or an alloy thereof, but is not limited thereto. Further, the gate electrode 303 may have a single layer or multiple layers.

The gate insulation layer 305 may be disposed on the substrate 301 to cover the gate electrode 303. The gate insulation layer 305 insulates the gate electrode 303 and the active layer 307 from each other. The gate insulation layer 305 may be formed of an insulative inorganic material such as silicon oxide (SiOx) or silicon nitride (SiNx), or may be formed of an insulative organic material.

The active layer 307 may be disposed on the gate insulation layer 305. The active layer 307 may be formed of polycrystalline silicon, and in this case, a partial area may be doped with impurities. Further, the active layer 307 may be formed of amorphous silicon, an organic semiconductor material, or oxide.

The source electrode 311 and the drain electrode 309 may be disposed on the gate insulation layer 305 and the active layer 307. The source electrode 311 and the drain electrode 309 may be formed of a metallic material, and may be formed of, e.g., any one of molybdenum (Mo), aluminum (Al), chromium (Cr), gold (Au), titanium (Ti), nickel (Ni), neodymium (Nd), and copper (Cu), or an alloy thereof, but are not limited thereto. Further, the source electrode 311 and the drain electrode 309 may have a single layer or multiple layers.

A planarization layer 313 is disposed on the driving transistor DRT. The planarization layer 313 is an insulation layer for protecting the driving transistor DRT and planarizing an upper portion of the driving transistor DRT. The planarization layer 313 may include a contact hole for electrically connecting the driving transistor DRT and the anode electrode 319 of the light emitting element ED.

Specifically, the planarization layer 313 includes a contact hole exposing any one of the source electrode 311 or the drain electrode 309 of the driving transistor DRT. The planarization layer 313 may be formed of an organic insulating material. The planarization layer 313 may be variously deformed, such as being formed as a single layer or may be composed of double or multiple layers.

A plurality of color filters 315 may be disposed on the planarization layer 313 at a position corresponding to the emission area of the light emitting element ED. The color filter 315 may be formed to emit red, green, blue, and white colors. The color filters 315 of each color may be sequentially arranged in a horizontal direction or a vertical direction, or may be alternately arranged.

An overcoat layer 317 may be positioned on the planarization layer 313 to cover the color filter 315.

The light emitting element ED is disposed on the overcoat layer 317. The light emitting element ED is driven by the driving transistor DRT and includes an anode electrode 319 and a cathode electrode 325 facing each other, and a, emission layer 323 interposed between the anode electrode 319 and the cathode electrode 325. The emission area of the light emitting element ED may be defined by a bank 321.

The anode electrode 319 is electrically connected to the driving transistor DRT. Specifically, the anode electrode 319 may be connected to any one of the source electrode 311 or the drain electrode 309 of the driving transistor DRT through a contact hole formed in the overcoat layer 317 and the planarization layer 313. Here, the anode electrode 319 is electrically connected to the drain electrode 309 of the driving transistor DRT. In this case, an image signal for displaying an image signal is applied to the anode electrode 319 through the drain electrode 309.

Since the anode electrode 319 must supply holes to the emission layer 323, the anode electrode 319 is formed of a conductive material having a high work function. For example, the anode electrode 319 may be formed of a transparent conductive oxide (TCO) such as indium tin oxide (ITO).

On the other hand, when the anode electrode 319 includes a multilayer thin film on which an oxide such as silicon oxide (SiO2) or titanium oxide (TiO2) is deposited, the anode electrode 319 may be used as an infrared reflective layer that reflects infrared light incident onto the anode electrode 319 thereby improving infrared reflectance of the anode electrode 319.

For example, the infrared reflectance of the anode electrode 319 may be 80% or more.

When the touch display device 100 is a bottom emission type organic light emitting display device, an oxide thin film with high infrared reflectance may be deposited on the anode electrode 319.

The anode electrodes 319 are disposed on the overcoat layer 317 to be spaced apart from each other for each subpixel.

The emission layer 323 is disposed on the anode electrode 319. The emission layer 323 may be formed of a phosphorescent or fluorescent material, and may further include a hole injecting layer, a hole transporting layer, an electron transporting layer, an electron injecting layer, or the like, if necessary. The emission layer 323 may include a material capable of emitting light of a specific color. For example, the emission layer 323 may include a light emitting material capable of emitting any one of red, green, and blue light. However, the disclosure is not limited thereto, and the emission layer 323 may include a light emitting material capable of emitting light of a different color.

The cathode electrode 325 is disposed to face the anode electrode 319 with the emission layer 323 interposed therebetween. The cathode electrode 325 supplies electrons to the emission layer 323. For example, the cathode electrode 325 may be formed of a metallic material having a low work function, such as a metal alloy such as MgAg, a metal alloy including ytterbium (Yb), or the like.

The bank 321 is disposed on the overcoat layer 317 for the remaining area except for the emission area. In other words, the bank 321 may be disposed to cover only a portion of the anode electrode 319 to expose a portion of the anode electrode 319, and an area corresponding to a portion of the anode electrode 319 exposed by the bank 321 may be defined as a emission area. The bank 321 may be formed of an inorganic insulating material such as silicon oxide or silicon nitride, or an organic insulating material such as an acrylic resin or an imide resin.

An encapsulation layer (not shown) may be disposed on the cathode electrode 325 of the light emitting element ED. The encapsulation layer is a component for protecting the light emitting element ED vulnerable to moisture from being exposed to moisture. For example, the encapsulation layer may be formed of a structure in which an inorganic layer and an organic layer are alternately stacked, or a structure in which an inorganic layer/organic layer/inorganic layer are stacked, but is not limited thereto.

Meanwhile, when the touch display device 100 is a bottom emission structure, an infrared absorption pattern 330 may be disposed as an encryption pattern under the substrate 301 corresponding to the emission surface. The infrared absorption pattern 330 may be formed as a dot pattern transmitting infrared light in the opening area where the pattern is not formed, but absorbing infrared light in the pattern area where the pattern is formed.

The infrared absorption pattern 330 may be formed directly on one side (for example, the back side) of the substrate 301 through a photo process using a photo resist or a printing process using an ink material. The area where the infrared absorption pattern 330 is formed may absorb the infrared light IR emitted from the infrared stylus 200, and an area where the infrared absorption pattern 330 is not formed may transmit the infrared light IR to enter into the inside of the display panel 110.

At this time, when the infrared absorption pattern 330 is formed on the surface of the substrate 301, the precision of the infrared absorption pattern 330 may be improved and the loss of the pattern or noise may be reduced compared to the case where the infrared absorption pattern 330 is formed on a separate film.

A portion of infrared light IR incident on the opening area of the infrared absorption pattern 330 may pass through the opening and is reflected from a metal electrode including a reflective layer such as the anode electrode 319, and the drain electrode 309 or source electrode 311 of the driving transistor DRT located inside the display panel 110 and may be transmitted to the outside of the display panel 110.

For example, when an oxide such as silicon oxide (SiO2) or titanium oxide (TiO2) is deposited as a multilayer thin film on the anode electrode 319, the drain electrode 309 or the source electrode 311 of the driving transistor DRT, it may be used as a reflective layer with high infrared reflectance.

The infrared reflectance of the anode electrode 319, the drain electrode 309 or the source electrode 311 of the driving transistor DRT may be 80% or more.

At this time, since the anode electrode 319 is located over the color filter 315, it is desirable to form a color filter 315 with a high transmittance of infrared light IR in order to use the anode electrode 319 as an infrared reflective electrode. For example, the color filter 315 may have a transmittance of 40% or less for visible light and a transmittance of 80% or more for infrared light.

Here, it illustrates a case where the anode electrode 319, the drain electrode 309 or source electrode 311 of the driving transistor DRT is used as an infrared reflective structure as an example, and various metal electrodes reflecting infrared light may be used as an infrared reflective structure.

A functional film 340 may be disposed under the substrate 301 to cover the infrared absorption pattern 330 such that the infrared absorption pattern 330 is between the functional film 340 and the substrate 301.

The functional film 340 may be formed to have an infrared transmittance higher than a reference level to reduce surface reflection and ensure good transmission of infrared lights.

In this way, the touch display device 100 of the disclosure may be effective in detecting the touch coordinates of the infrared stylus 200 by using an infrared absorption pattern 330 formed on a surface of the display panel 110 and a metal electrode formed inside the display panel 110 as an infrared reflective structure.

Therefore, the touch display device 100 of the disclosure has no need to form a separate infrared reflective layer on the surface of the display panel 110, since the metal electrode formed inside the display panel 110 has a characteristic of a certain reflectance or more (e.g., 80%) for infrared lights. As a result, it is possible to form a display panel 110 capable of detecting infrared touch without additional processes.

Figure 6:
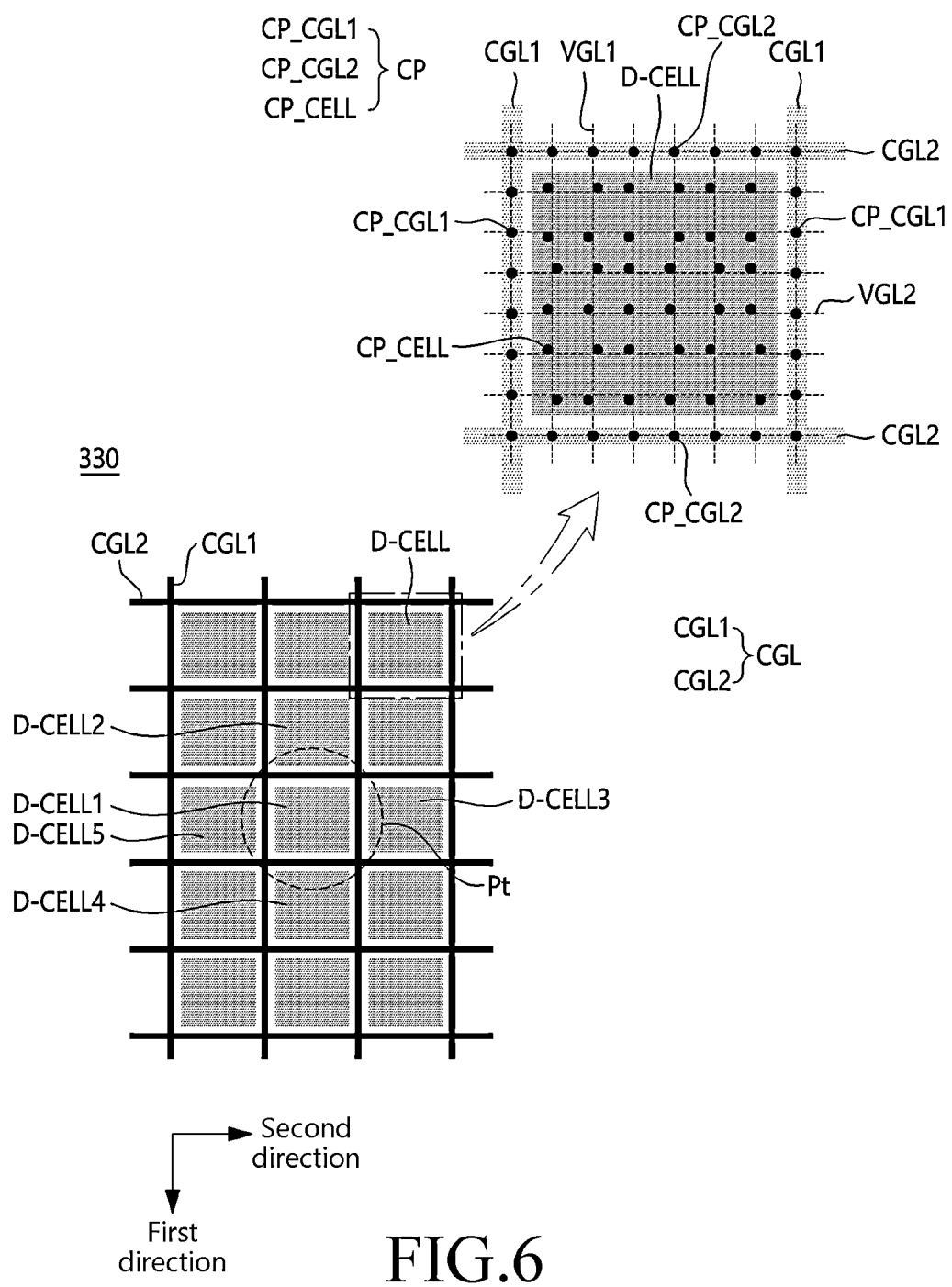
FIG. 6 is a view illustrating a configuration of an infrared absorption pattern in a display panel according to embodiments of the disclosure.

FIG. 6 is a view illustrating a configuration of an infrared absorption pattern in a display panel according to embodiments of the disclosure.

Referring to FIG. 6, the infrared absorption pattern 330 in the display panel 110 according to embodiments of the disclosure may include guide lines CGL and cell areas D-CELL located between the guide lines CGL.

For example, the infrared absorption pattern 330 may include a plurality of cell areas D-CELL arranged in rows and columns, a plurality of first guide lines CGL1 disposed between adjacent cell areas D-CELL in a second direction, and a plurality of second guide lines CGL2 disposed between adjacent cell areas D-CELL in a first direction.

Each of the plurality of first guide lines CGL1 may extend in the first direction, and each of the plurality of second guide lines CGL2 may extend in the second direction.

The plurality of infrared absorption patterns 330 may include a plurality of first guide patterns CP_CGL1 for indicating the plurality of first guide lines CGL1, a plurality of second guide patterns CP_CGL2 for indicating the plurality of second guide lines CGL2, and a plurality of cell patterns CP_CELL disposed in rows and columns in the plurality of cell areas D-CELL.

The array shape of the plurality of cell patterns CP_CELL may be different for each of the plurality of cell areas D-CELL.

The plurality of cell patterns CP_CELL included in each of the plurality of cell areas D-CELL may be arranged in a matrix form of m rows and n columns.

In each of the plurality of cell areas D-CELL, the plurality of cell patterns CP_CELL may be arranged along virtual grid lines VGL1, VGL2 of m rows and n columns.

Each of the plurality of cell areas D-CELL may correspond to one coordinate data. The entire arrangement position of the plurality of cell patterns CP_CELL included in each of the plurality of cell areas D-CELL may represent one coordinate data. Accordingly, the positions of the plurality of cell patterns CP_CELL arranged in m rows and n columns for each of the plurality of cell areas D-CELL may be slightly different.

The plurality of cell patterns CP_CELL included in each of the plurality of cell areas D-CELL may have a unique array shape (also referred to as a unique array position pattern) corresponding to unique coordinates.

The unique array position pattern of the plurality of cell patterns CP_CELL included in each of the plurality of cell areas D-CELL may be an encryption pattern representing one unique coordinate.

For example, each of the plurality of cell areas D-CELL may include a unique pattern arranged in 36 cell patterns CP_CELL with six rows and six columns to represent (code) unique coordinates.

The first cell area D-CELL1 may include 36 cell patterns CP_CELL to represent the first coordinates. The second cell area D-CELL2 may include 36 cell patterns CP_CELL to represent the second coordinates. The third cell area D-CELL3 may include 36 cell patterns CP_CELL to represent the third coordinates. The fourth cell area D-CELL4 may include 36 cell patterns CP_CELL to represent the fourth coordinates. The fifth cell area D-CELL5 may include 36 cell patterns CP_CELL to represent fifth coordinates.

The array position of the 36 cell patterns CP_CELL included in the first cell area D-CELL1 may be an encryption pattern indicating the first coordinates, the array position of the 36 cell patterns CP_CELL included in the second cell area D-CELL2 may be an encryption pattern indicating the second coordinates, the array position of the 36 cell patterns CP_CELL included in the third cell area D-CELL3 may be an encryption pattern indicating the third coordinates, the array position of the 36 cell patterns CP_CELL included in the fourth cell area D-CELL4 may be an encryption pattern indicating the fourth coordinates, and the array position of the 36 cell patterns CP_CELL included in the fifth cell area D-CELL5 may be an encryption pattern indicating the fifth coordinates.

In other words, the first coordinates corresponding to the first cell area D-CELL1, the second coordinates corresponding to the second cell area D-CELL2, the third coordinates corresponding to the third cell area D-CELL3, the fourth coordinates corresponding to the fourth cell area D-CELL4, and the fifth coordinates corresponding to the fifth cell area D-CELL5 are all different. Accordingly, the array position of the 36 cell patterns CP_CELL included in the first cell area D-CELL1, the array position of the 36 cell patterns CP_CELL included in the second cell area D-CELL2, the array position of the 36 cell patterns CP_CELL included in the third cell area D-CELL3, the array position of the 36 cell patterns CP_CELL included in the fourth cell area D-CELL4, and the array position of the 36 cell patterns CP_CELL included in the fifth cell area D-CELL5 may all be different from each other.

Each of the plurality of cell areas D-CELL may correspond to a partial area of the display area DA. Each cell area D-CELL may overlap a group of two or more subpixels among a plurality of subpixels included in the display area DA. For example, the first cell area D-CELL1 may overlap a first group including two or more first subpixels, and the second cell area D-CELL2 may overlap a second group including two or more second subpixels. Two or more first subpixels included in the first group and two or more second subpixels included in the second group may be different from each other.

The infrared stylus 200 may recognize the plurality of infrared absorption patterns 330 based on the infrared light IR output by the infrared stylus 200 that is reflected from the infrared reflective electrodes of the light emitting elements and the infrared reflective electrodes of the transistors as a pattern of infrared light, may recognize the plurality of first guide lines CGL1 and the plurality of second guide lines CGL2 based on the recognition result, and may recognize the plurality of cell areas D-CELL partitioned by the plurality of first guide lines CGL1 and the plurality of second guide lines CGL2.

The infrared stylus may recognize the array position of the plurality of cell patterns CP_CELL included in at least one of the plurality of cell areas D-CELL, and may determine the position (touch position) of the infrared stylus based on the recognition result.

For example, when the infrared stylus touches the position Pt centered on the first cell area D-CELL1, the infrared stylus may recognize the array position of the plurality of cell patterns CP_CELL included in each of the first to fifth cell areas D-CELL1 to D-CELL5 based on the detecting result of the reflected pattern of infrared light with a different shade or wavelength, and may calculate a more precise touch position based on the first to fifth coordinates corresponding to the first to fifth cell areas D-CELL1 to D-CELL5 and the difference in signal intensities between the reflected lights.

Figure 7:
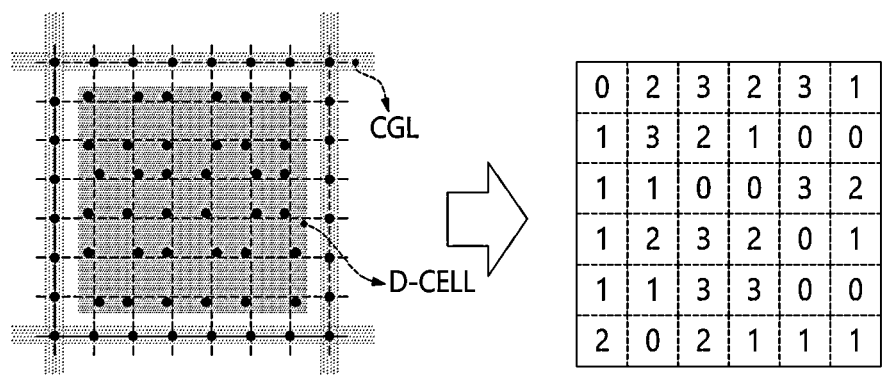
FIG. 7 is a diagram illustrating an infrared absorption pattern formed in a touch display device according to embodiments of the disclosure.

FIG. 7 is a diagram illustrating an infrared absorption pattern formed in a touch display device according to embodiments of the disclosure.

Referring to FIG. 7, the infrared absorption pattern 330 of the touch display device 100 according to embodiments of the disclosure may be formed as a dot pattern that absorbs infrared light on the surface of the substrate 301.

The infrared absorption pattern 330 may include cell areas D-CELL where the encrypted dot pattern is located and guide lines CGL for distinguishing the cell areas D-CELL. The dots located in the cell areas D-CELL may be corresponded to dot values designated based on the position at which they were formed within the cell area D-CELL. For example, each dot may correspond to a dot value of 0 to 3 depending on which direction the dot is located (up, down, left and right) from the intersection of the virtual grid lines in the cell area D-CELL.

Additionally, each dot value may be converted into a first bit value of X coordinates and a second bit value of Y coordinates. By combining the corresponding information, the coordinates on the surface of the display panel 110 including the infrared absorption pattern 330 may be determined.

Here, it illustrates a case that 6×6 dots are arranged in a unit grid including horizontal and vertical areas of a certain length and they have different patterns no matter which direction the dot distributions are detected. The unit grid formed by these 36 dots may represent different coordinates on the surface of the display panel 110.

The infrared stylus 200 may determine the dot value corresponding to the infrared absorption pattern 330 by detecting infrared lights reflected from the display panel 110 through the infrared sensor 210.

Figure 8A:
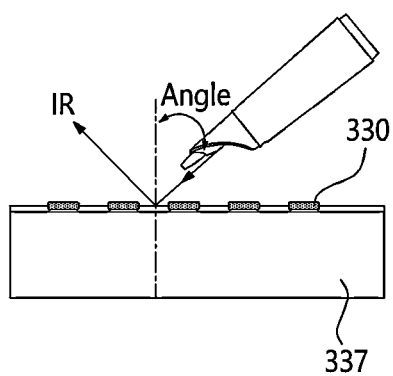
FIGS. 8A and 8B are diagrams illustrating experimental data in which reflected light is detected through an infrared sensor of an infrared stylus when an infrared reflective layer and an infrared absorption pattern are formed of a stacked structure in a touch display device.
Figure 8B:
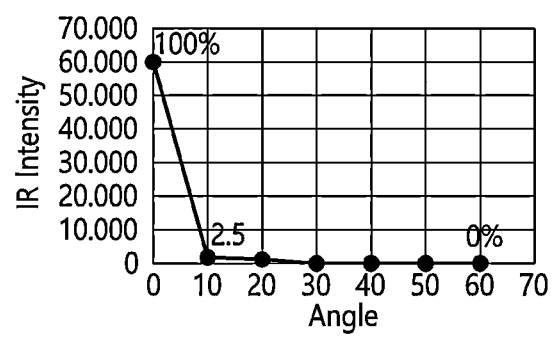

FIGS. 8A and 8B are diagrams illustrating experimental data in which reflected light is detected through an infrared sensor of an infrared stylus when an infrared reflective layer and an infrared absorption pattern are formed of a stacked structure in a touch display device.

Referring to FIGS. 8A and 8B, when the infrared reflective layer 337 and the infrared absorption pattern 330 are formed of an adjacent stacked structure in the touch display device 100, infrared light reflected from the infrared reflective layer 337 may not enter into the infrared sensor 210 depending on an inclination angle Angle of the infrared stylus 200.

For example, the infrared reflective layer 337 may be formed to have a high transmittance of visible light (e.g., 80 to 90%) to reduce the decrease of luminance in the display panel 110 and may be made of a multilayer thin film to increase the reflectance of infrared light (e.g., more than 80%).

At this time, the infrared light incident on the infrared reflective layer 337 of the multilayer thin film may have a wider area through which the reflected lights are transmitted as the inclination angle increases.

As a result, the larger the inclination angle Angle formed by the normal line of the infrared stylus 200 and the touch display device 100, the more the reflected lights cannot be transmitted to the infrared sensor of the infrared stylus 200. Thus, the infrared stylus 200 becomes more difficult to detect touch coordinates.

However, the touch display device 100 of the disclosure may effectively detect the touch coordinates by using metal electrodes (e.g., anode electrode, source electrode, drain electrode, etc.) formed inside the display panel 110 as reflective electrodes without separate infrared reflective layer, even if the inclination angle Angle of the infrared stylus 200 increases.

On the other hand, when the infrared absorption pattern 330 is formed on the infrared reflective layer 337 through a printing process, a defect may occur in the infrared absorption pattern 330 due to the printing tolerance of the pattern, pattern loss, and noise (foreign substances, ink bleeding, etc.).

In addition, since it is difficult to check whether the infrared absorption pattern 330 is printed normally on the infrared reflective layer 337, some problems including a difficult process and a cost increase due to the infrared reflective layer 337 may occur.

In contrast, since the touch display device 100 of the disclosure may form an infrared absorption pattern 330 on the surface of a smooth substrate 301 and form a functional film 340 with high infrared transmittance on the infrared absorption pattern 330, noise caused by the infrared absorption pattern 330 may be reduced and touch precision may be improved. In one embodiment, the functional film 340 is more transmissive of infrared light than visible light.

Figure 9:
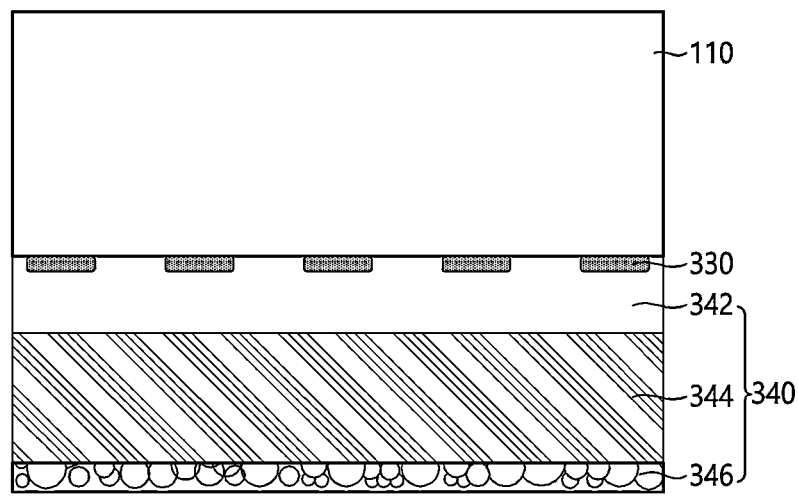
FIG. 9 is a view illustrating a structure of a functional film coupled to an infrared absorption pattern in a touch display device according to embodiments of the disclosure.

FIG. 9 is a view illustrating a structure of a functional film coupled to an infrared absorption pattern in a touch display device according to embodiments of the disclosure.

Referring to FIG. 9, the functional film 340 coupled to the infrared absorption pattern 330 in the touch display device 100 according to embodiments of the disclosure may include an adhesive layer 342, a base film 344 and a surface treatment layer 346.

The surface treatment layer 346 may be formed by dissolving an acrylic material in a solvent, applying it to the outer surface of the base film 344, and then evaporating the solvent by applying heat. Otherwise, the surface treatment layer 346 may be formed by dissolving an acrylic material in a solvent, applying it to the outer surface of the base film 344, and then chemically curing it by irradiating it with ultraviolet rays. The surface treatment layer 346 may be formed to a thickness of about 3-10 um.

The surface treatment layer 346 may improve the hardness of the functional film 340 and may reduce infrared reflection from the surface of the functional film 340. In one embodiment, the surface treatment layer 346 is made of a material that is harder than the base film 344 and the adhesive layer 342. In addition, it may include an anti-smudge coating that reduces visibility due to oil contamination by controlling fine dust on the surface and improving lipophilic properties.

The base film 344 may be formed of a tri-acetyl-cellulose (TAC) film or a polyester (PET) film.

The adhesive layer 342 may have a higher transmittance of infrared light than a transmittance of visible light to reduce an infrared reflection on the substrate 301.

The adhesive layer 342 may include a base resin, a crosslinking agent, a binder, and an additive. The base resin is a polymer material formed of an acrylic monomer, and may be, e.g., alkyl acrylate having 4 to 17 carbon atoms. The base resin may include the functional group monomer that regulates the polar group and reacts with the crosslinking agent.

The crosslinking agent may connect linear copolymer chains to form a three-dimensional network structure, and may enhance the cohesion of the adhesive layer 342 to enhance heat resistance performance.

The binder forms a strong bonding force to a portion (e.g., a substrate) to which the adhesive layer 342 is coupled. In particular, the binder may enhance the bonding force with the adhesive layer 342, which is an organic material, when the bonded portion is an inorganic material.

The additive prevents charging of the adhesive layer 342, and a dye or pigment for controlling transmittance may be injected.

Figure 10:
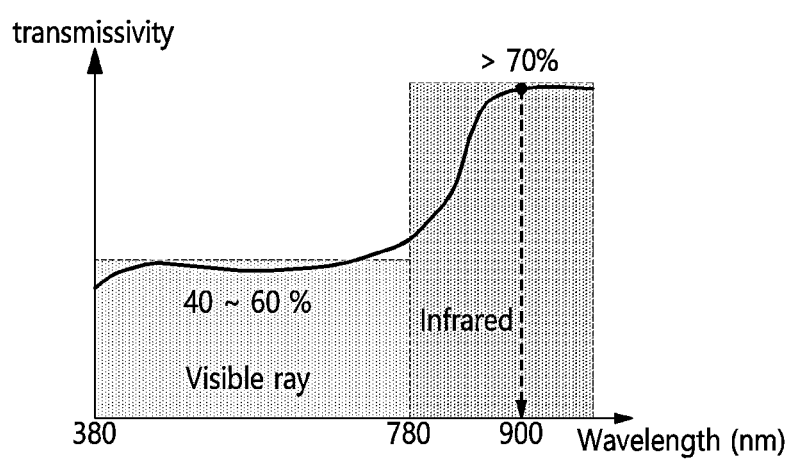
FIG. 10 is a view illustrating a transmittance of an adhesive layer constituting a functional film in a touch display device according to embodiments of the disclosure.
Figure 11:
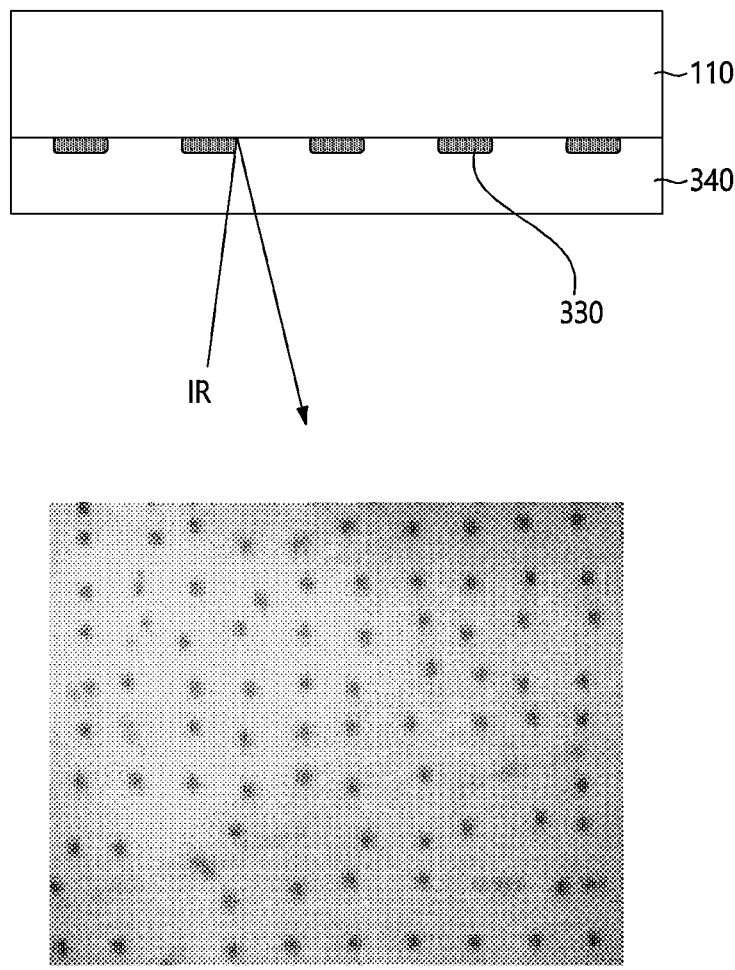
FIG. 11 is a view illustrating an image of an infrared absorption pattern obtained by photographing infrared lights reflected through a functional film in a touch display device according to embodiments of the disclosure.

FIG. 10 is a view illustrating a transmittance of an adhesive layer constituting a functional film in a touch display device according to embodiments of the disclosure, and FIG. 11 is a view illustrating an image of an infrared absorption pattern obtained by photographing infrared lights reflected through a functional film in a touch display device according to embodiments of the disclosure.

Referring to FIGS. 10 and 11, the touch display device 100 according to embodiments of the disclosure may include an infrared absorption pattern 330 formed on a surface (e.g., a substrate) of the display panel 110 and a functional film 340 formed to cover the infrared absorption pattern 330.

In this case, the functional film 340 may have a higher transmittance of infrared light than the transmittance of visible light, thereby reducing a noise for the infrared absorption pattern 330 and enhancing touch precision.

For example, the functional film 340 may maintain the transmittance of visible light at 40% to 60% and the transmittance of infrared light at 70% or more to reduce visible light reflected from the inside of the display panel 110.

To that end, the component of the dye or pigment injected into the additive constituting the functional film 340 may be adjusted.

As described above, when the functional film 340 has a high infrared transmittance, the infrared absorption pattern 330 formed in the display panel 110 may be clearly detected by photographing the infrared lights reflected from the inside of the display panel 110.

At this time, the location of the infrared absorption pattern 330 may be changed in various ways.

Figure 12:
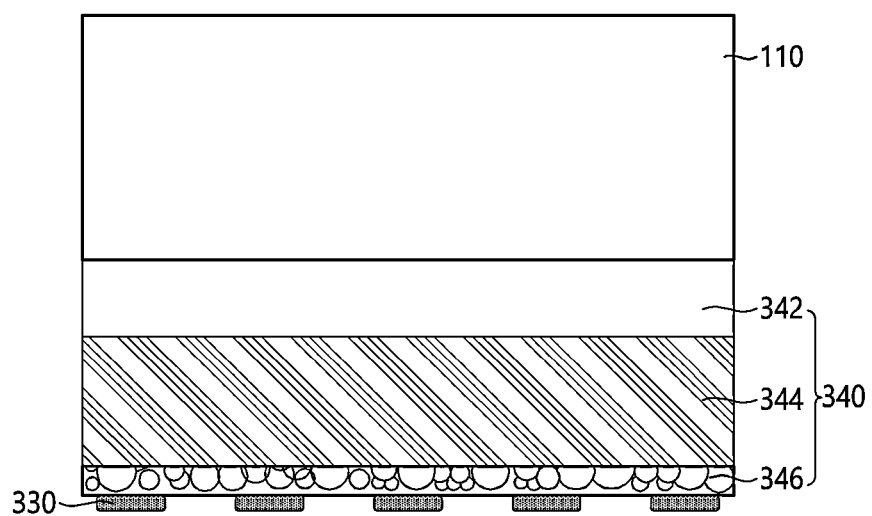
FIG. 12 is a view illustrating an infrared absorption pattern being formed on the surface of a functional film in a touch display device according to embodiments of the disclosure.

FIG. 12 is a diagram illustrating an infrared absorption pattern being formed on the surface of a functional film in a touch display device according to embodiments of the disclosure.

Referring to FIG. 12, the functional film 340 in the touch display device 100 according to embodiments of the disclosure may include an adhesive layer 342 coupled to a display panel 110, a base film 344 and a surface treatment layer 346.

The surface treatment layer 346 may improve the hardness of the functional film 340 and may reduce infrared reflection from the surface of the functional film 340. In addition, it may include an anti-smudge coating that reduces visibility due to oil contamination by controlling fine dust on the surface and improving lipophilic properties.

The base film 344 may be formed of a tri-acetyl-cellulose (TAC) film or a polyester (PET) film.

The adhesive layer 342 may have a higher transmittance of infrared light than a transmittance of visible light to reduce an infrared reflection on the substrate 301.

The adhesive layer 342 may include a base resin, a crosslinking agent, a binder, and an additive. The base resin is a polymer material formed of an acrylic monomer, and may be, e.g., alkyl acrylate having 4 to 17 carbon atoms. The base resin may include the functional group monomer that regulates the polar group and reacts with the crosslinking agent.

At this time, the infrared absorption pattern 330 may be located on the outer surface of the surface treatment layer 346 constituting the functional film 340. As shown in FIG. 12, the infrared absorption pattern 330 is in direct contact with the surface treatment layer 346.

Figure 13:
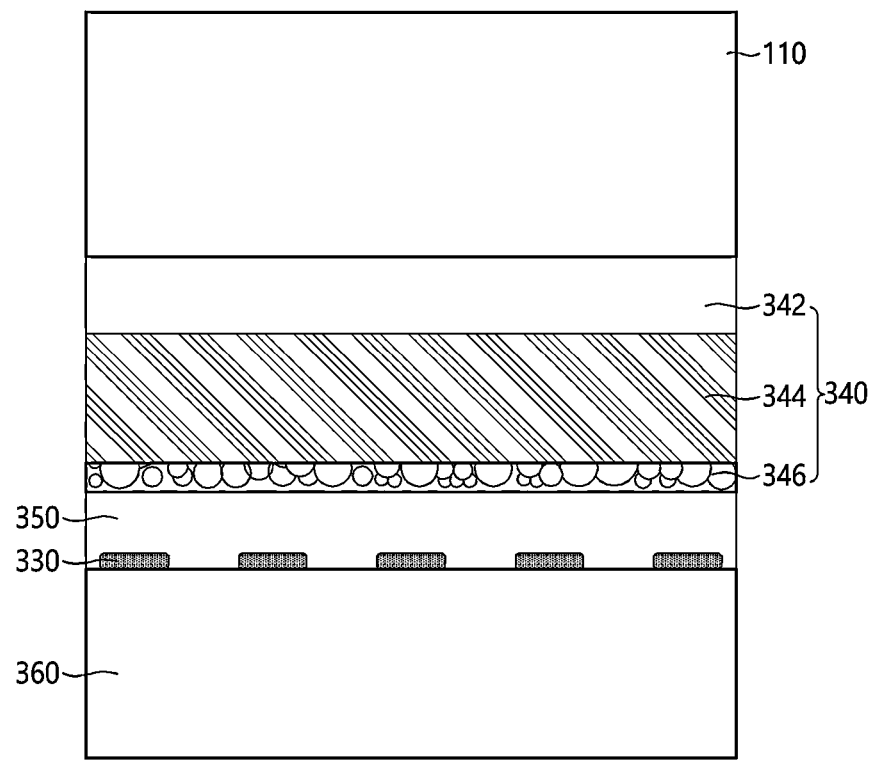
FIG. 13 is a diagram illustrating an infrared absorption pattern being formed on the surface of a cover glass in a touch display device according to embodiments of the disclosure.

FIG. 13 is a diagram illustrating an infrared absorption pattern being formed on the surface of a cover glass in a touch display device according to embodiments of the disclosure.

Referring to FIG. 13, the functional film 340 in the touch display device 100 according to embodiments of the disclosure may include an adhesive layer 342, a base film 344 and a surface treatment layer 346.

The surface treatment layer 346 may improve the hardness of the functional film 340 and may reduce infrared reflection from the surface of the functional film 340. In addition, it may include an anti-smudge coating that reduces visibility due to oil contamination by controlling fine dust on the surface and improving lipophilic properties.

The base film 344 may be formed of a tri-acetyl-cellulose (TAC) film or a polyester (PET) film.

The adhesive layer 342 coupled to the display panel 110 may have a higher transmittance of infrared light than a transmittance of visible light to reduce an infrared reflection on the substrate 301.

Here, the functional film 340 may be attached to the cover glass 360 by an adhesive 350. At this time, the infrared absorption pattern 330 may be fixed on the surface of the cover glass 360 by the adhesive 350 such that the infrared absorption pattern 330 is between the cover glass 360 and the adhesive 350.

Figure 14:
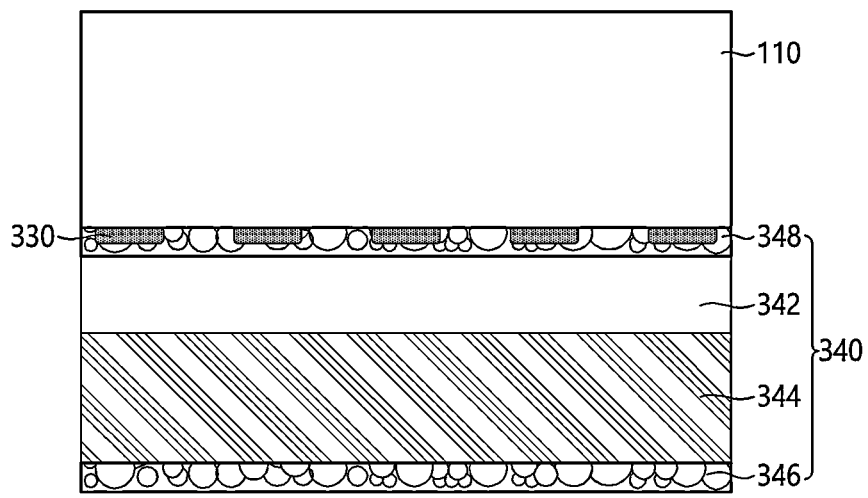
FIG. 14 is a diagram illustrating another structure of a functional film coupled to an infrared absorption pattern in a touch display device according to embodiments of the disclosure.

FIG. 14 is a diagram illustrating another structure of a functional film coupled to an infrared absorption pattern in a touch display device according to embodiments of the disclosure.

Referring to FIG. 14, the functional film 340 coupled to the infrared absorption pattern 330 in the touch display device 100 according to embodiments of the disclosure may include an adhesive layer 342, a base film 344, a surface treatment layer 346 and a diffusion bead layer 348.

Since the surface treatment layer 346, the base film 344 and the adhesive layer 342 are the same as described above, further description will be omitted.

The diffusion bead layer 348 may be made of particles to scatter infrared light entering into the interior of the display panel 110 or reflected from the interior of the display panel 110.

Since infrared light are scattered by the diffusion bead layer 348, the infrared light may be effectively detected through the infrared absorption pattern 330 regardless of the position or inclination angle Angle of the infrared stylus 200.

The diffusion bead layer 348 may be arranged to contact with the adhesive layer 342 or to the surface treatment layer 346. Here, it illustrates a case where the diffusion bead layer 348 contacts with the adhesive layer 342 as an example.

Meanwhile, the infrared absorption pattern 330 and the functional film 340 in the touch display device 100 of the disclosure may be applied to the top emission structure.

Figure 15:
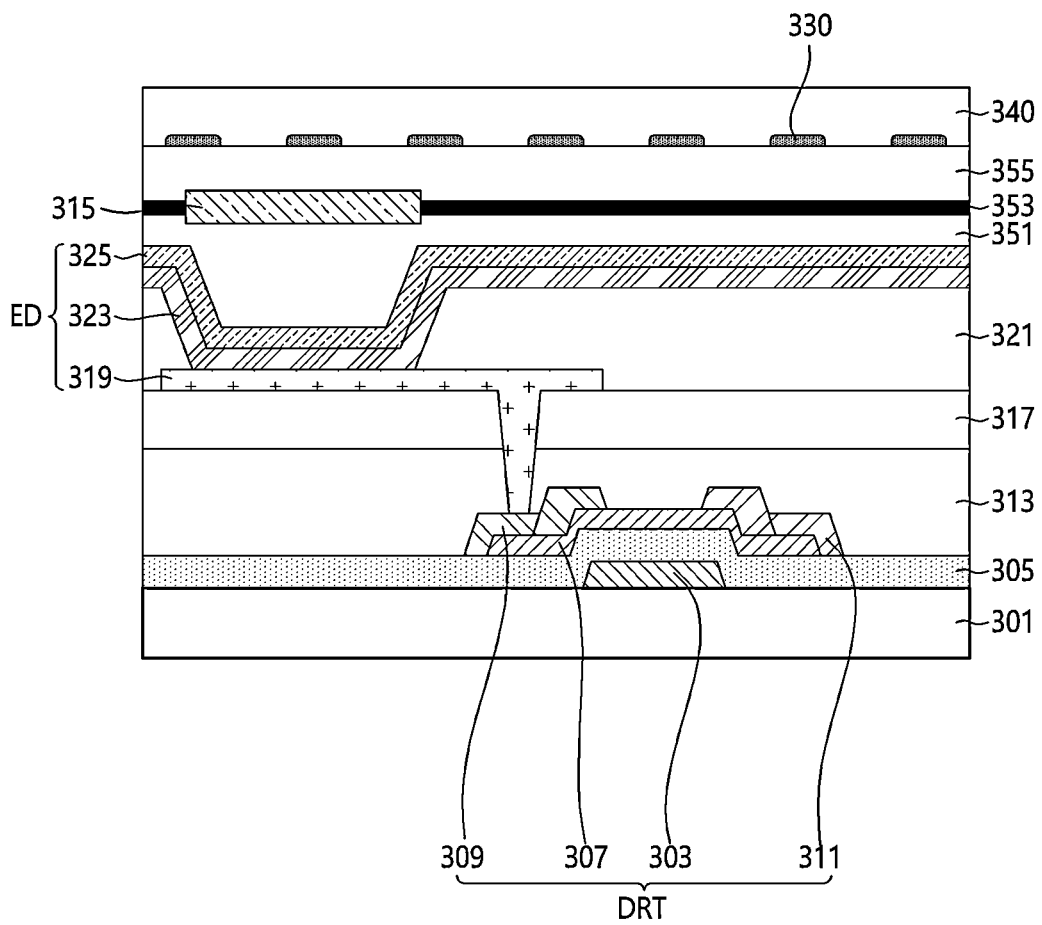
FIG. 15 is a cross-sectional view schematically illustrating a top emission structure of a touch display device according to embodiments of the disclosure.

FIG. 15 is a cross-sectional view schematically illustrating a top emission structure of a touch display device according to embodiments of the disclosure.

Referring to FIG. 15, a touch display device 100 according to embodiments of the disclosure may include a substrate 301, a driving transistor DRT, a color filter 315, a light emitting element ED, an infrared absorption pattern 330, and an infrared reflective structure.

Here, the driving transistor DRT is illustrated as an example, but the switching transistors SWT1 and SWT2 may have a structure similar to that of the driving transistor DRT depending on the position.

The substrate 301 may be formed of a transparent glass material or plastic.

The driving transistor DRT includes a gate electrode 303, an active layer 307, a drain electrode 309, and a source electrode 311, and is a transistor for driving the light emitting element ED. The driving transistor DRT may be a bottom gate structure in which the gate electrode 303, the gate insulation layer 305, the active layer 307, the drain electrode 309, and the source electrode 311 are sequentially stacked.

The gate insulation layer 305 may be disposed on the substrate 301 to cover the gate electrode 303. The gate insulation layer 305 insulates the gate electrode 303 and the active layer 307 from each other. The gate insulation layer 305 may be formed of an insulative inorganic material such as silicon oxide (SiOx) or silicon nitride (SiNx), or may be formed of an insulative organic material.

The active layer 307 may be disposed on the gate insulation layer 305. The active layer 307 may be formed of polycrystalline silicon, and in this case, a partial area may be doped with impurities. Further, the active layer 307 may be formed of amorphous silicon, an organic semiconductor material, or oxide.

The source electrode 311 and the drain electrode 309 may be disposed on the gate insulation layer 305 and the active layer 307. The source electrode 311 and the drain electrode 309 may be formed of a metallic material, and may be formed of a metallic material, and may be formed of, e.g., any one of molybdenum (Mo), aluminum (Al), chromium (Cr), gold (Au), titanium (Ti), nickel (Ni), neodymium (Nd), and copper (Cu), or an alloy thereof, but are not limited thereto. Further, the source electrode 311 and the drain electrode 309 may have a single layer or multiple layers.

A planarization layer 313 is disposed on the driving transistor DRT. The planarization layer 313 is an insulation layer for protecting the driving transistor DRT and planarizing an upper portion of the driving transistor DRT. The planarization layer 313 may include a contact hole for electrically connecting the driving transistor DRT and the anode electrode 319 of the light emitting element ED.

Specifically, the planarization layer 313 includes a contact hole exposing any one of the source electrode 311 or the drain electrode 309 of the driving transistor DRT. The planarization layer 313 may be formed of an organic insulating material. The planarization layer 313 may be variously deformed, such as being formed as a single layer or may be composed of double or multiple layers.

An overcoat layer 317 may be positioned on the planarization layer 131.

The light emitting element ED is disposed on the overcoat layer 317. The light emitting element ED is driven by the driving transistor DRT and includes an anode electrode 319 and a cathode electrode 325 facing each other, and an emission layer 323 interposed therebetween. The emission area of the light emitting element ED may be defined by a bank 321.

The anode electrode 319 is electrically connected to the driving transistor DRT. Specifically, the anode electrode 319 may be connected to any one of the source electrode 311 or the drain electrode 309 of the driving transistor DRT through a contact hole formed in the overcoat layer 317 and the planarization layer 313. Here, the anode electrode 319 is electrically connected to the drain electrode 309 of the driving transistor DRT. In this case, an image signal for displaying an image signal is applied to the anode electrode 319 through the drain electrode 309.

Since the anode electrode 319 must supply holes to the emission layer 323, the anode electrode 319 is formed of a conductive material having a high work function. For example, the anode electrode 319 may be formed of a transparent conductive oxide (TCO) such as indium tin oxide (ITO).

The anode electrodes 319 are disposed on the overcoat layer 317 to be spaced apart from each other for each subpixel.

The emission layer 323 is disposed on the anode electrode 319. The emission layer 323 may be formed of a phosphorescent or fluorescent material, and may further include a hole injecting layer, a hole transporting layer, an electron transporting layer, an electron injecting layer, or the like, if necessary. The emission layer 323 may include a material capable of emitting light of a specific color.

The cathode electrode 325 is disposed to face the anode electrode 319 with the emission layer 323 interposed therebetween. The cathode electrode 325 supplies electrons to the emission layer 323. For example, the cathode electrode 325 may be formed of a metallic material having a low work function, such as a metal alloy such as MgAg, a metal alloy including ytterbium (Yb), or the like.

When the touch display device 100 is a top emission type organic light emitting display device, the cathode electrode 325 may include a reflective layer with high reflectance of infrared light.

In this case, the cathode electrode 325 may be used as an infrared reflective layer by depositing an oxide such as silicon oxide (SiO2) or titanium oxide (TiO2) as a multilayer thin film.

The infrared reflectance of the cathode electrode 325 may be 80% or more.

The bank 321 is disposed on the overcoat layer 317 for the remaining area except for the emission area. In other words, the bank 321 may be disposed to cover only a portion of the anode electrode 319 to expose a portion of the anode electrode 319, and an area corresponding to a portion of the anode electrode 319 exposed by the bank 321 may be defined as an emission area. The bank 321 may be formed of an inorganic insulating material such as silicon oxide or silicon nitride, or an organic insulating material such as an acrylic resin or an imide resin.

An encapsulation layer 351 may be disposed on the cathode electrode 325. The encapsulation layer 351 is configured to protect the light emitting element ED, which is vulnerable to moisture, from being exposed to moisture. For example, the encapsulation layer 351 may be formed of a structure in which an inorganic layer and an organic layer are alternately stacked, or a structure in which an inorganic layer/organic layer/inorganic layer is stacked, but is not limited thereto.

The color filter 315 may be disposed at a position corresponding to the emission area on the encapsulation layer 351. The color filter 315 may be formed to emit red, green, blue, and white colors. The color filters 315 of each color may be sequentially arranged in a horizontal direction or a vertical direction, or may be alternately arranged.

A black matrix 353 for preventing light from leaking may be disposed in an area in which the color filter 315 is not disposed.

An upper substrate 355 may be coupled to an upper portion of the color filter 315 and the black matrix 353.

Meanwhile, when the touch display device 100 is a top emission structure, an infrared absorption pattern 330 may be disposed as a specific pattern on a surface of the substrate 301 corresponding to the emission surface. The infrared absorption pattern 330 may be formed as a dot pattern transmitting infrared light in the opening area where the pattern is not formed, but absorbing infrared light in the pattern area where the pattern is formed.

The infrared absorption pattern 330 may be formed through a photo process using a photo resist or a printing process using an ink material. The area where the infrared absorption pattern 330 is formed may absorb the infrared light emitted from the infrared stylus 200, and an area where the infrared absorption pattern 330 is not formed may transmit the infrared light to enter into the inside of the display panel 110.

At this time, when the infrared absorption pattern 330 is formed on the surface of the upper substrate 355, the precision of the infrared absorption pattern 330 may be improved and the loss of the pattern or noise may be reduced compared to the case where the infrared absorption pattern 330 is formed on a separate film.

Infrared light incident on the opening area of the infrared absorption pattern 330 may pass through the color filter 315, may be reflected from a metal electrode such as the cathode electrode 325, and may be reflected back to the outside of the display panel 110.

At this time, since the cathode electrode 325 is located over the color filter 315, it is desirable to form the color filter 315 made of a material that transmits infrared lights when the cathode electrode 325 is used as an infrared reflective electrode.

Here, it illustrates a case where the cathode electrode 325 is used as an infrared reflective structure as an example, and various metal electrodes reflecting infrared light may be used as an infrared reflective structure.

A functional film 340 may be disposed on the upper substrate 355 to cover the infrared absorption pattern 330.

The functional film 340 may be formed to have an infrared transmittance higher than a reference level to reduce surface reflection and ensure good transmission of infrared lights.

In this way, the touch display device 100 of the disclosure may effective detect the touch coordinates of the infrared stylus 200 by using an infrared absorption pattern 330 formed on a surface of the display panel 110 and a metal electrode formed inside the display panel 110 as an infrared reflective structure.

In particular, since the touch display device 100 of the disclosure uses a metal electrode formed inside the display panel 110 as an infrared reflective structure, there is no need to form a separate infrared reflective layer and it is easy to form the display panel 110 into a lightweight and thin structure.

Embodiments of the disclosure described above are briefly described below.

A touch display device according to embodiments of the disclosure may comprise a display panel including a plurality of light emitting elements and a plurality of transistors and an infrared absorption pattern formed on an emission surface of the display panel, wherein electrodes included in the plurality of light emitting elements or electrodes included in the plurality of transistors are infrared reflective electrodes.

The infrared reflective electrodes are anode electrodes or cathode electrodes of the plurality of light emitting elements.

The infrared reflective electrodes are source electrodes or drain electrodes of the plurality of transistors.

The infrared reflective electrodes include a multilayer thin film deposited with silicon oxide or titanium oxide.

The infrared reflective electrodes have an infrared reflectance of 80% or more.

A color filter with at least one color is disposed between the plurality of light emitting elements and the infrared absorption pattern.

The color filter has a transmittance of 40% or less for visible light and a transmittance of 80% or more for infrared light.

The infrared absorption pattern is disposed on a surface of a substrate located on the emission surface of the display panel.

The infrared absorption pattern includes cell areas where different encrypted dot patterns are located and guide lines for distinguishing the cell areas.

The dot patterns located in the cell areas correspond to dot values determined according to positions.

The touch display device may further comprise a functional film covering the infrared absorption pattern.

The functional film includes an adhesive layer for coupling to the display panel, a surface treatment layer to improve hardness and a base film located between the surface treatment layer and the adhesive layer.

The adhesive layer has a higher transmittance for infrared light than a transmittance for visible light.

The adhesive layer has a transmittance of 40 to 80% for visible light.

The adhesive layer has a transmittance of 70% or more for infrared light.

The functional film further includes a diffusion bead layer made of particles for scattering infrared lights.

A touch display device according to embodiments of the disclosure may comprise a display panel including a plurality of light emitting elements and a plurality of transistors, a functional film disposed on an emission surface of the display panel and an infrared absorption pattern disposed on the functional film, wherein electrodes included in the plurality of light emitting elements or electrodes included in the plurality of transistors are infrared reflective electrodes.

The infrared absorption pattern is fixed to a cover glass through an adhesive on an outer surface of the functional film.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A touch display device, comprising:
    a display panel including a plurality of light emitting elements that are configured to emit light and a plurality of transistors that are electrically connected to the plurality of light emitting elements;
    an infrared absorption pattern configured to absorb infrared light that is incident on the infrared absorption pattern, the infrared absorption pattern on an emission surface of the display panel through which the light emitted by the plurality of light emitting elements is emitted outside of the display panel; and
    a functional film covering the infrared absorption pattern, the functional film having a transmittance of the infrared light that is greater than a transmittance of visible light,
    wherein the plurality of light emitting elements include infrared reflective electrodes that reflect infrared light incident onto the infrared reflective electrodes or the plurality of transistors include infrared reflective electrodes that reflect infrared light incident onto the infrared reflective electrodes,
    wherein the functional film includes:
        an adhesive layer that couples the functional film to the display panel;
        a surface treatment layer; and
        a base film between the surface treatment layer and the adhesive layer,
        wherein the surface treatment layer is harder than the adhesive layer and the base film.

2. The touch display device of claim 1, wherein the infrared reflective electrodes of the plurality of light emitting elements are anode electrodes or cathode electrodes included in the plurality of light emitting elements.

3. The touch display device of claim 1, wherein the infrared reflective electrodes of the plurality of transistors are source electrodes or drain electrodes included in the plurality of transistors.

4. The touch display device of claim 1, wherein the infrared reflective electrodes included in the plurality of light emitting elements or the infrared reflective electrodes included in the plurality of transistors comprise a multilayer thin film including silicon oxide or titanium oxide.

5. The touch display device of claim 1, wherein the infrared reflective electrodes included in the plurality of light emitting elements or the infrared reflective electrodes included in the plurality of transistors have a reflectance of infrared light of 80% or more.

6. The touch display device of claim 1, further comprising:
    a color filter including at least one color, the color filter between a light emitting element from the plurality of light emitting elements and the infrared absorption pattern.

7. The touch display device of claim 6, wherein the color filter has a transmittance of visible light of 40% or less and a transmittance of infrared light of 80% or more.

8. The touch display device of claim 1, wherein the infrared absorption pattern is on a surface of a substrate located on the emission surface of the display panel.

9. The touch display device of claim 1, wherein the infrared absorption pattern includes:
    a plurality of cell areas, each cell area of the plurality of cell areas including an encrypted dot pattern that is unique to the cell area; and
    a plurality of guide lines that define the plurality of cell areas.

10. The touch display device of claim 9, wherein each dot included in the encrypted dot pattern of each cell area corresponds to a dot value that is based a position of the dot within the cell area.

11. The touch display device of claim 1, wherein the adhesive layer has a transmittance of the infrared light that is greater than a transmittance of visible light.

12. The touch display device of claim 11, wherein the adhesive layer has a transmittance of 40% to 80% of the visible light.

13. The touch display device of claim 11, wherein the adhesive layer has a transmittance of 70% or more of the infrared light.

14. The touch display device of claim 1, wherein the functional film further comprises a diffusion bead layer including particles that scatter the infrared light.

15. A touch sensing system, comprising:
    a pen configured to output infrared light;
    a display panel including a plurality of light emitting elements that are configured to emit visible light, the plurality of light emitting elements including infrared reflective electrodes that reflect a portion of the infrared light outputted by the pen that is incident onto the infrared reflective electrodes;
    an infrared absorption pattern on the display panel, the infrared absorption pattern configured to absorb a portion of the infrared light outputted by the pen that is incident on the infrared absorption pattern; and
    a functional film in contact with the infrared absorption pattern, the functional film having a transmittance of infrared light that is greater than a transmittance of visible light,
    wherein the pen is configured to sense its location on the display panel according to a pattern of infrared light reflected back to the pen, the pattern of infrared light including the infrared light reflected from the infrared reflective electrodes of the plurality of light emitting elements,
    wherein the functional film includes an adhesive layer, and the touch sensing system further comprises a cover glass that is attached to the adhesive layer such that the infrared absorption pattern is between the adhesive layer and the cover glass.

16. The touch sensing system of claim 15, wherein the display panel further includes a plurality of transistors that are electrically connected to the plurality of light emitting elements, the plurality of transistors including infrared reflective electrodes that reflect a portion of the infrared light outputted by the pen that is incident onto the infrared reflective electrodes of the plurality of transistors.

* * * * *